United States Patent [19]

Carney

[11] Patent Number: 4,991,344
[45] Date of Patent: Feb. 12, 1991

[54] APPARATUS FOR HOLDING PLANTS, POTS OR THE LIKE

[76] Inventor: Raymond M. Carney, Mobile, Ala.

[21] Appl. No.: 890,168

[22] Filed: Jul. 28, 1986

[51] Int. Cl.⁵ .................. A47G 7/02; F16M 11/20
[52] U.S. Cl. ................................. 47/39; 47/47; 248/188.1; 211/133
[58] Field of Search ............... 47/39, 40, 44, 45, 47; 248/188, 188.1; 211/33, 37, 133; 446/111, 112; 428/189

[56] References Cited

U.S. PATENT DOCUMENTS

| | | | |
|---|---|---|---|
| 217,010 | 7/1879 | Hancock | 47/39 |
| 317,443 | 5/1885 | Cunnington | 47/39 |
| 577,230 | 2/1897 | Boyd | 47/39 |
| 699,154 | 5/1902 | Force | 47/39 |
| 2,919,878 | 1/1960 | Nathan | 248/188 |
| 3,084,465 | 4/1963 | Hellrick | 428/7 |
| 3,991,686 | 11/1976 | Mechachonis | 47/39 |
| 4,163,537 | 8/1979 | Mourgue | 248/188.1 |

FOREIGN PATENT DOCUMENTS 968489  5/1983  United Kingdom ............ 47/39

Primary Examiner—Danton D. DeMille
Assistant Examiner—Bradley Lewis
Attorney, Agent, or Firm—Sughrue, Mion, Zinn, Macpeak & Seas

[57] ABSTRACT

The present invention relates to a device for hanging plants, pots or the like. The apparatus is comprised of a hollow center post having modularly pieced components upon which is mounted radially extending arms and legs. A center hub is provided for mounting the radially extending arms and legs to said center post. The center post is adapted for being supported in its upright position by various type means for mounting on the floor, a tree dolly or for mounting directly into the earth.

4 Claims, 2 Drawing Sheets

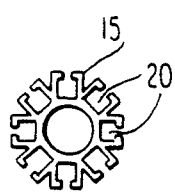
FIG. 3
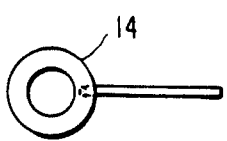
FIG. 4
FIG. 1
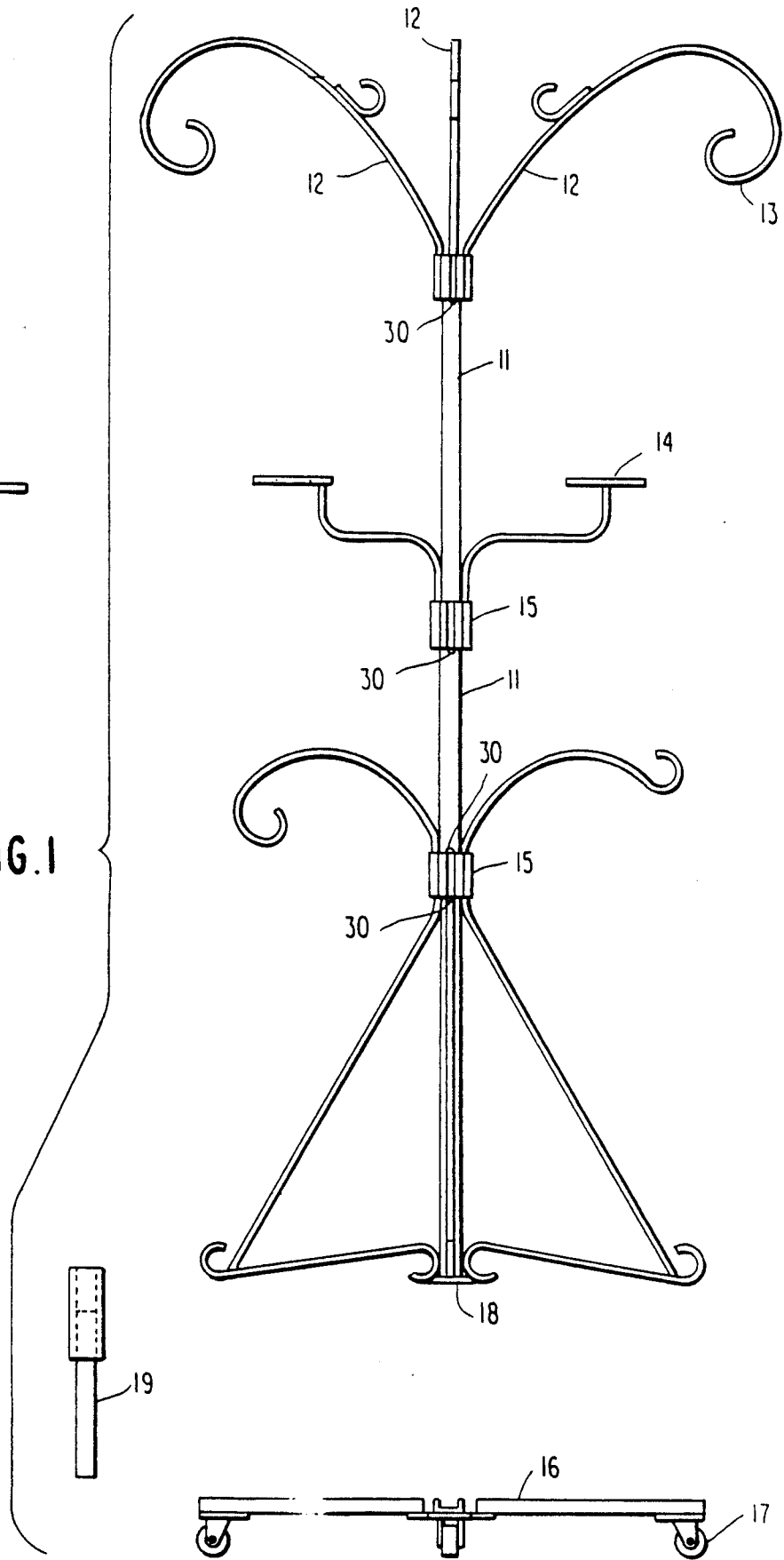

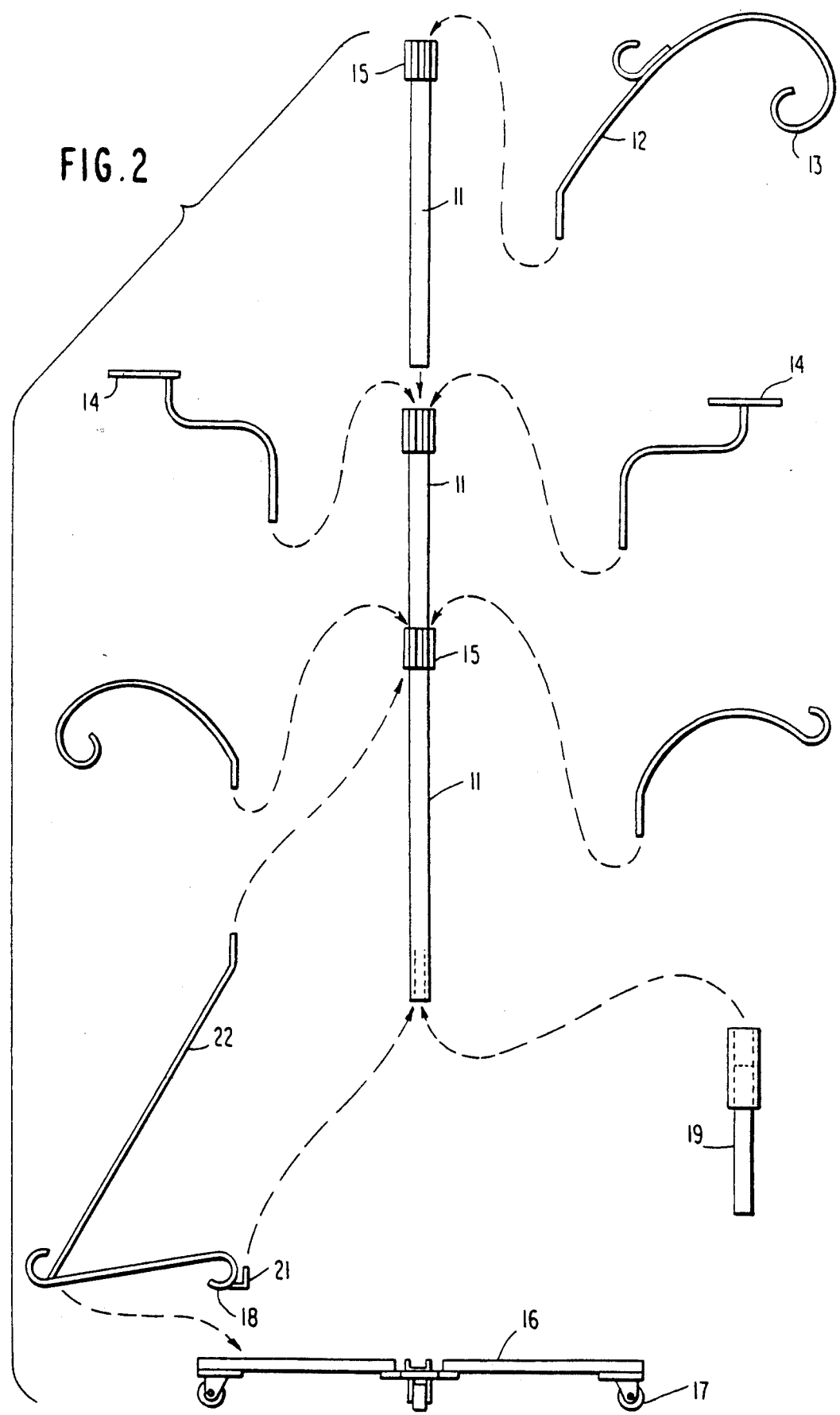

APPARATUS FOR HOLDING PLANTS, POTS OR THE LIKE

BACKGROUND OF THE INVENTION

Devices for plants, pots or the like, frequently referred to as flower stands, have been described in the prior art. However, none of the prior art devices contain the features of the present invention.

Donner, in U.S. Pat. No. 2,794,554, described a display stand made of metal for supporting a plurality of potted plants. Furthermore, the stand was adapted for free rotation with respect to its supporting means. Crawford, in U.S. Pat. No. 37,070, described a flower stand capable of supporting and exhibiting at one view a large number of flowers growing in pots and which allowed for arrangement in a variety of ways. Boyd, in U.S. Pat. No. 577,230 described a portable flower stand for providing a cheap, simple and ornamental flower stand for supporting potted flowers or plants and providing suitable means for watering the same. Ashcraft, in U.S. Pat. No. Des. 250,686 described the ornamental design for a reversible holder for plants, pots or the like. Hills, in U.S. Pat. No. 150,320, described a flower stand having a central post upon which was placed one or more hubs having grooves therein for holding the arms of the flower stand. Sheldon, in U.S. Pat. No. 47,664, described a flower stand having one or more sets of radial arms secured on a central, vertical shaft arranged so as to turn horizontally and to be adjusted up and down. Erkson, in U.S. Pat. No. 113,035, described a flower stand having revolving disks mounted on a central shaft whereby radial arms were mounted in the revolving disks so that the arms could turn or swing freely.

SUMMARY OF INVENTION

The present invention generally relates to the field of devices for holding flower pots, plants and the like. The present invention provides a new and improved apparatus for accomplishing these tasks.

The present invention generally consists of a modular, hollow, center post comprised of a plurality of pieces for mounting on either a movable tree dolly, the floor or flush with the earth. Mounted onto the central post are radially extending arms for hanging plants, holding pots and for forming a part of the support for the legs of the stand. Additionally, the present invention provides a new and unique method of joining the pieces making up the center post while at the same time providing a hub for mounting and supporting the radially extending arms and central post stand.

The hubs have a plurality of square-shaped mounting sockets on their periphery wherein are placed the ends of the radially extending arms which ends are also square. Furthermore, the radially extending arm is made of square ironwork or similar material.

Accordingly, with the present invention in use, one can easily make many different and varied arrangements and uses of the plant stand. One can easily adjust the height of the stand, can add and remove as many radially extending arms as asthetically appealing, and can place the stand either directly on the floor, on a rolling tree dolly or on the ground or earth.

DESCRIPTION OF DRAWINGS

FIG. 1 is an elevation view of the present invention in operative connection.

FIG. 2 is an elevation view of the present invention.

FIG. 3 is top view of hub 15 showing square shaped sockets 20.

FIG. 4 is a top view of a radially extending arm terminating in a plate 14.

DESCRIPTION OF THE PREFERRED EMBODIMENTS

Turning to the drawings, more particularly, FIG. 1, some of the major elements of the present invention are depicted. The modular, hollow, central post comprised of a plurality of pieces is shown, 11, being in operative connection to the other structural members of the present invention. Mounted on to said center post are shown a plurality of radially extending arms, 12. Said radially arms, 12, can be of a type for hanging flower pots, 13, or for placing flower pots thereupon by using a plate, 14. Additionally, there is shown the hub, 15, for mounting said radially extending arms to said center post. Said hub, 15, is attached to said central post, 11, by multiple spot welds, 30. Additionally, three embodiments of center post supporting stands are shown in FIG. 1 being a tree dolly, 16, having wheels, 17, thereupon for easy mobility; radially extending supporting legs, 18, for placement directly upon and/or adjacent to a floor or other medium; and, a mounting bracket or pipe sleeve, 19, for allowing the plant stand to be mounted directly in the earth by pushing said mounting bracket into said earth.

Turning to FIG. 2, there is shown the hollow modular center post, 11, said radially extending arms, 12, for both hanging pots, 13, and mounting pots upon said plates, 14. Furthermore, said hub is shown both in operative connection and in non-operative connection, 15. Likewise, said tree dolly, 16, having wheels, 17, thereupon, and mounting brackets, 18, and 19, are shown. While said center post, 11, is shown in two pieces in FIG. 2, other pieces could be used to increase the height of center post. Note that said arms, 12, 13, can be mounted into the top or bottom of said hubs, 15.

Note that said radially extending arms are manufactured of square shaped iron work for mounting on to said hub, said hub having square shaped sockets, 20, integrally formed and/or extruded on its outer peripheral edge, said sockets running the entire length of said hub. Additionally, shown in FIG. 2, is the L-shaped hook-support, 21, for holding the leg supports, 22, in place upon the center post, 11.

The teachings of this specification are meant to be illustrative and explanatory thereof and various changes in the size, shape and material, as well as in the illustrative construction of the preferred embodiments can be made without departing from the spirit of this invention. Many other embodiments of the invention could be easily manufactured by simply modifying the invention as hereinabove described.

I claim:

1. An apparatus of adjustable size for hanging potted plants and holding potted plants comprising:
   (a) a hollow center post formed of at least two similarly-shaped hollow pieces, said pieces being joined together by inserting said pieces into suitably adapted connecting means;

(b) said connecting means also having a plurality of integrally formed peripheral openings adapted to hold, by insertion into said openings, a plurality of functional radially extending arms, said radially extending arms being mountable in either the top or bottom of said openings;

(c) said radially extending arms being adapted for hanging potted plants via hook-shaped means or being adapted for holding potted plants via a supporting plate, said apparatus capable of being vertically elongated by addition of further hollow pieces and a corresponding number of connecting means, and the overall configuration of said apparatus being adaptable to hold a specific number of potted plants by inserting a specific number of said radially extending arms into said openings in said connecting means.

2. The structure of claim 1, further comprising:
(a) said openings being multiple square shaped sockets.

3. The structure of claim 1, further comprising:
(a) said center post being supported by radially extending legs;
(b) said radially extending legs being mounted into the lower end of said connecting means; and
(c) said radially extending legs having an L-shaped hook on its lower member said hook being connected into the lower part of said center post.

4. The structure of claim 3, further comprising:
(a) said radially extending arms and legs being composed of square shaped iron work.

* * * * *